United States Patent [19]

Sato

[11] Patent Number: 5,526,239
[45] Date of Patent: Jun. 11, 1996

[54] COMBINATION HEADLAMP FOR A MOTOR VEHICLE

[75] Inventor: Masakazu Sato, Shizuoka, Japan

[73] Assignee: Koito Manufacturing Co., Ltd., Tokyo, Japan

[21] Appl. No.: 277,750

[22] Filed: Jul. 20, 1994

[30] Foreign Application Priority Data

Jul. 23, 1993 [JP] Japan .................. 5-183015

[51] Int. Cl.⁶ .................. B60Q 1/02; F21M 3/18
[52] U.S. Cl. .................. 362/66; 362/244; 362/232; 362/287; 362/310
[58] Field of Search .................. 362/61, 66, 232, 362/240, 287, 427, 428, 347, 346, 311, 328, 332, 310, 244, 236

[56] References Cited

U.S. PATENT DOCUMENTS

| | | | |
|---|---|---|---|
| 5,047,903 | 9/1991 | Choji | 362/61 |
| 5,067,056 | 11/1991 | Suzuki et al. | 362/66 |
| 5,172,972 | 12/1992 | Terao | 362/66 |
| 5,209,558 | 5/1993 | Suzuki et al. | 362/66 |
| 5,285,362 | 2/1994 | Sakata | 362/61 |
| 5,394,310 | 2/1995 | Iwasaki | 362/61 |

*Primary Examiner*—Leonard E. Heyman
*Attorney, Agent, or Firm*—Sughrue, Mion, Zinn, Macpeak & Seas

[57] ABSTRACT

A combination headlamp for a motor vehicle in which at least two headlamps with reflectors are contained in a lamp chamber defined by a capsule like lamp body and a synthetic resin front lens secured to the front opening of the lamp body. The front lens includes protruded portions, substantially circular when viewed from the front and shaped like a dish in cross-section, which are located and sized corresponding to the lamps. The front area of each of the dish-like protruded portions is curved outward, and is fringed with flare regions which expand outward and downward. With such a construction, the cross-sectional secondary moment of the front lens is great, so that the shock resistance of the front lens is high. The surface area of the front lens is also great, so that the heat resistance is improved.

16 Claims, 4 Drawing Sheets

5,526,239

COMBINATION HEADLAMP FOR A MOTOR VEHICLE

BACKGROUND OF THE INVENTION

1. Field of the Invention

The present invention relates to a combination headlamp which contains at least two headlamps with reflectors housed in a lamp chamber.

2. Related Art

A conventional headlamp of this type as disclosed in Unexamined Japanese Patent Application No. Hei 2-162602, for example. As illustrated in FIGS. 1 and 2, the publication discloses a combination headlamp in which two projection lamps 3 and 4 are contained in a lamp chamber defined by a lamp body 1 and a front lens 2. Each of the projection lamps 3 and 4 consists of a single unit structure constructed by coupling together an elliptic reflector a, which contains a light source located at the first focal point, and a projection lens b by a tubular lens holder c. The projection lamp 4 is a lamp only for main beams, and the projection lamp 3 is a lamp for both main beams and sub-beams. A shade e for clear-cut line formation is disposed in a lens holder c of the projection lamp 3. The front lens 2 mounted in the front opening of the lamp body 1 is made of synthetic resin and shaped like a capsule. The front lens 2 has circular areas 2a and 2b corresponding to the projection lamps 3 and 4. Each circular area extends to the front from a step 2c.

Thus, the headlamp contains two lamps 3 and 4 in the lamp chamber. Because of this, the headlamp is larger in size than the headlamp of the type in which a single lamp is contained in the lamp chamber. Also, the front lens 2 is large in area. The front lens of the conventional combination headlamp as described above is substantially flat in shape, and simply a two-dimensional expansion of the front lens of the headlamp of the single-lamp type. Therefore, it is easily deformed when it receives an impact or shock.

When the combination headlamp of the two-lamp type is compared with an array of two headlamps each of the single-lamp type, the former requires a smaller space occupied by one lamp than the latter, because the former is more compact in size. When the two lamps are simultaneously lit, e.g., in a main beam mode, temperature increases dramatically in the lamp chamber, and the front lens becomes highly susceptible to thermal deformation.

SUMMARY OF THE INVENTION

In view of the above circumstances, an object of the present invention is to provide a combination headlamp for a motor vehicle which has an excellent shock resistant and heat resistant front lens.

The above and other objects can be achieved by providing a combination headlamp for a motor vehicle which, according to the present invention, includes at least two headlamps with reflectors that are contained in a lamp chamber defined by a vessel like lamp body and a synthetic resin front lens secured to the front opening of the lamp body, in which the front lens includes protruded portions, substantially circular when viewed from the front and shaped like a dish in cross section, which are located and sized corresponding to the lamps, the front area of each of the dish-like protruded portions being curved outward, and are respectively fringed with flare regions expanded outward and downward.

With provision of the substantially circular, dish-like protruded portions and the flare regions formed around the fringes of the protruded portions, the cross-sectional secondary moment of the front lens is increased, so that the rigidity or shock resistance of the front lens is high. Further, with the protruded portions and the flare regions, the surface area of the front lens 11 is increased, so that a quantity of heat transferred per unit area is small and the heat radiation is improved.

DESCRIPTION OF THE PREFERRED EMBODIMENTS

Figure 1:
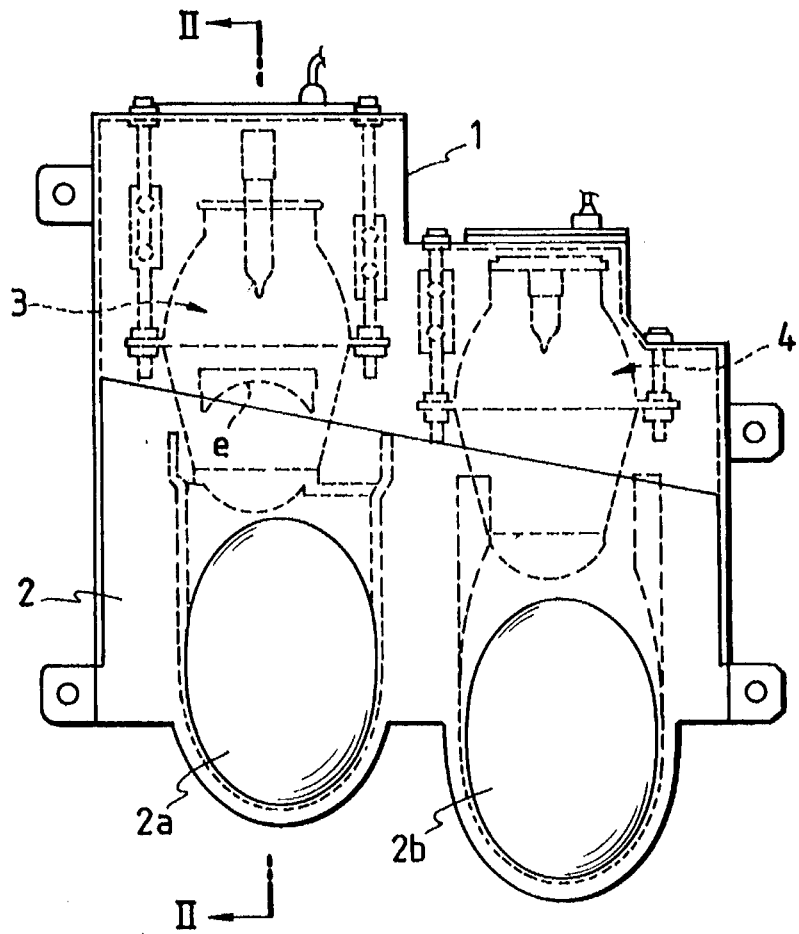
FIG. 1 is a front view showing a conventional headlamp.
Figure 2:
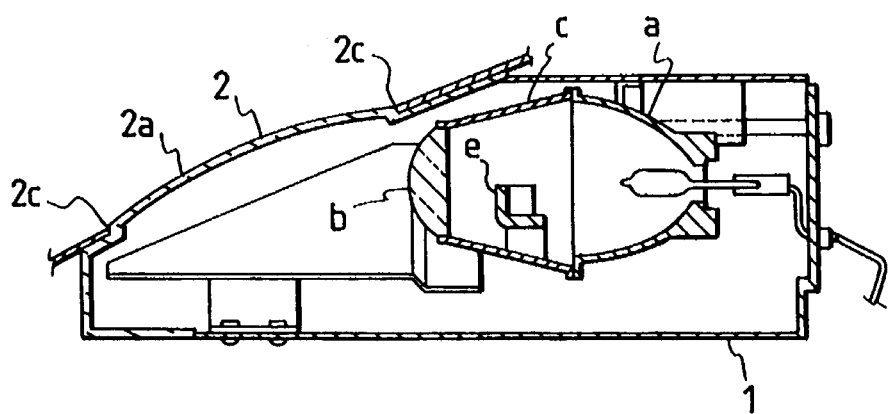
FIG. 2 is a longitudinal sectional view showing the headlamp along a line II—II of FIG. 1)

The preferred embodiment of the present invention will now be described with reference to the accompanying drawings.

FIGS. 3–8 show a combination headlamp according to an embodiment of the present invention. Reference numeral 10 denotes a capsule-like lamp body, made of synthetic resin, of which the front is opened and rectangular in shape. A front lens 11 is mounted on the lamp body 10, thereby forming a lamp chamber. A reflecting lamp 20 and a projection lamp 30 are disposed side by side within the lamp chamber, thereby forming a headlamp structure.

The front lens 11, made of synthetic resin, includes a seal leg 11a extending from the circumferential edge of the front lens. A seal groove 10a is formed in the circumferential edge of the front opening of the lamp body 10. The front lens 11 is secured to the lamp body 10 by inserting the seal leg 11a into the seal groove 10a.

Areas 12 and 13 of the front lens 11, shaped like horizontally elongated ellipsoids when viewed from the front, are located and sized corresponding to the lamps 20 and 30 so that these areas greatly protrude in the forward direction. By providing the shaped areas, the front lens 11 is improved in shock resistance. The front lens 11 includes protruded portions 12a and 13a each shaped to be elliptical in front and like a dish in cross section. The front area of each of the dish-like protruded portions 12a and 13a is curved outward or in the forward direction. The protruded portions 12a and 13a are respectively fringed with flare regions 12b and 13b, which expand outward and downward. When the front lens thus constructed is compared with the front lens in which the curved, protruded portion 12a is extended to the front, the longitudinal protrusion of the former is greater than that of the latter. Accordingly, a cross section secondary moment of the front lens is large, so that it possesses improved strength against bending, twist, compression, and the like. Further, because of the greater protrusion, the surface area of the front lens 11 is increased, and the amount of heat transferred per unit area is small. Therefore, the heat radiation is good, and a heat resistance of the front lens is improved.

The reflecting lamp 20 of the reflection type includes a reflector 22 with an elliptical surface, and a bulb 24 inserted into a bulb receiving hole of the reflector 22. Light beams emitted from the bulb 24 are reflected, by the reflector 22, into parallel light beams. The direction of the parallel light beams is controlled by light distribution control steps formed in the rear surface of the front lens 11, so that a distribution pattern for main beams is formed.

The lamp 30 of the projection type includes an elliptically-shaped reflector 32; a bulb 34, inserted into a bulb receiving hole of the reflector 32 and located at a first focal point of the reflector 32; a tubular lens holder 36 with a shade 37 extended to a second focal point of the reflector 32; and a projection lens 38 held by the lens holder 36. The projection lamp 30 thus structured forms a light distribution pattern for sub-beams with a clear-cut line defined by the shade 37, and projects the thus shaped sub-beams forward. A horizontal extended part 37a, shaped like a reed, extends forward from the center (when laterally viewed) of the front of the shade 37. The horizontal extended part 37a shuts off unwanted reflecting light, which goes to the front of the projection lamp 30 and is reflected in the upward direction on a bumper 16 (see FIG. 7).

The lamps 20 and 30 are coupled together by an attachment 42 extending across the lamps 20 and 30. The attachment 42 is tiltably supported on the lamp body 10 by means of an aiming mechanism 40 (see FIG. 3). The aiming mechanism 40 includes a vertical aiming screw 44, a horizontal aiming screw 45, and a ball joint 46. The aiming screws 44 and 45, which pass through the rear wall of the lamp body 10 and extend forward, are rotatably supported by the rear wall of the lamp body 10. The front ends of the aiming screws 44 and 45 are screwed to nuts (not shown) mounted on the attachment 42. The ball joint 46 is provided between the lamp body rear wall and the attachment 42. When the vertical aiming screw 44 is turned, the lamps 20 and 30, coupled with the attachment 42, tilt about a horizontal axis $L_x$ in unison. When the horizontal aiming screw 45 is turned, the lamps 20 and 30 tilt about a vertical axis $L_y$ in unison. Thus, the optical axes of the lamps 20 and 30 can be tilted vertically and horizontally by using the aiming screws 44 and 45.

Figure 3:
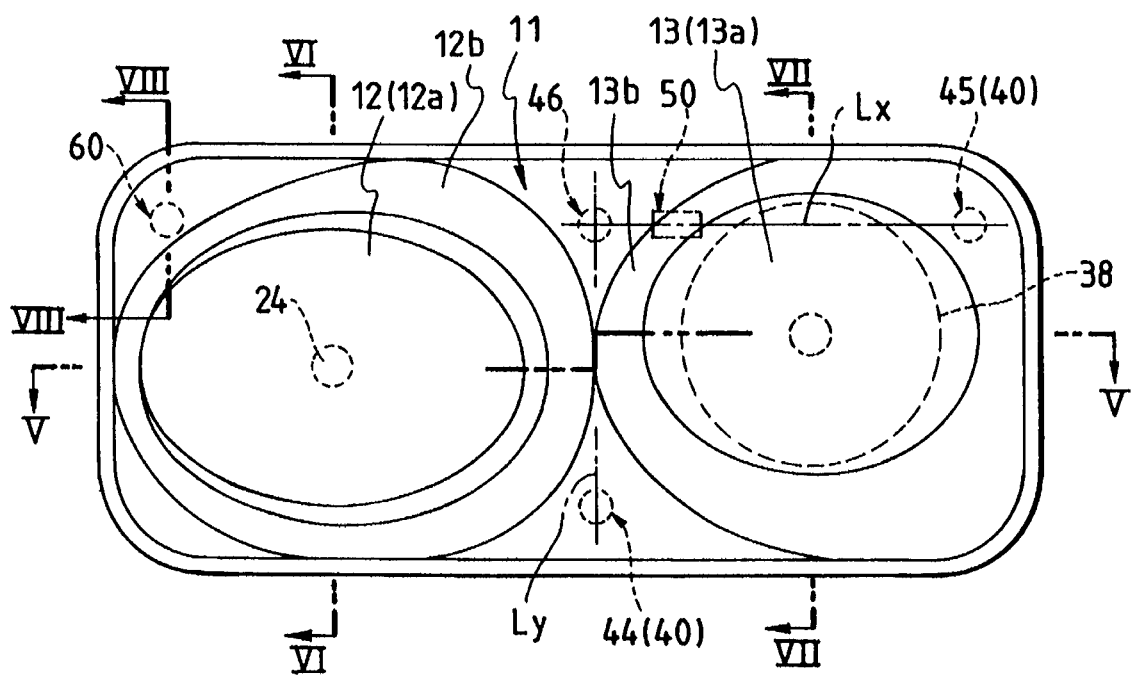
FIG. 3 is a front view showing a combination headlamp according to an embodiment of the present invention.
Figure 5:
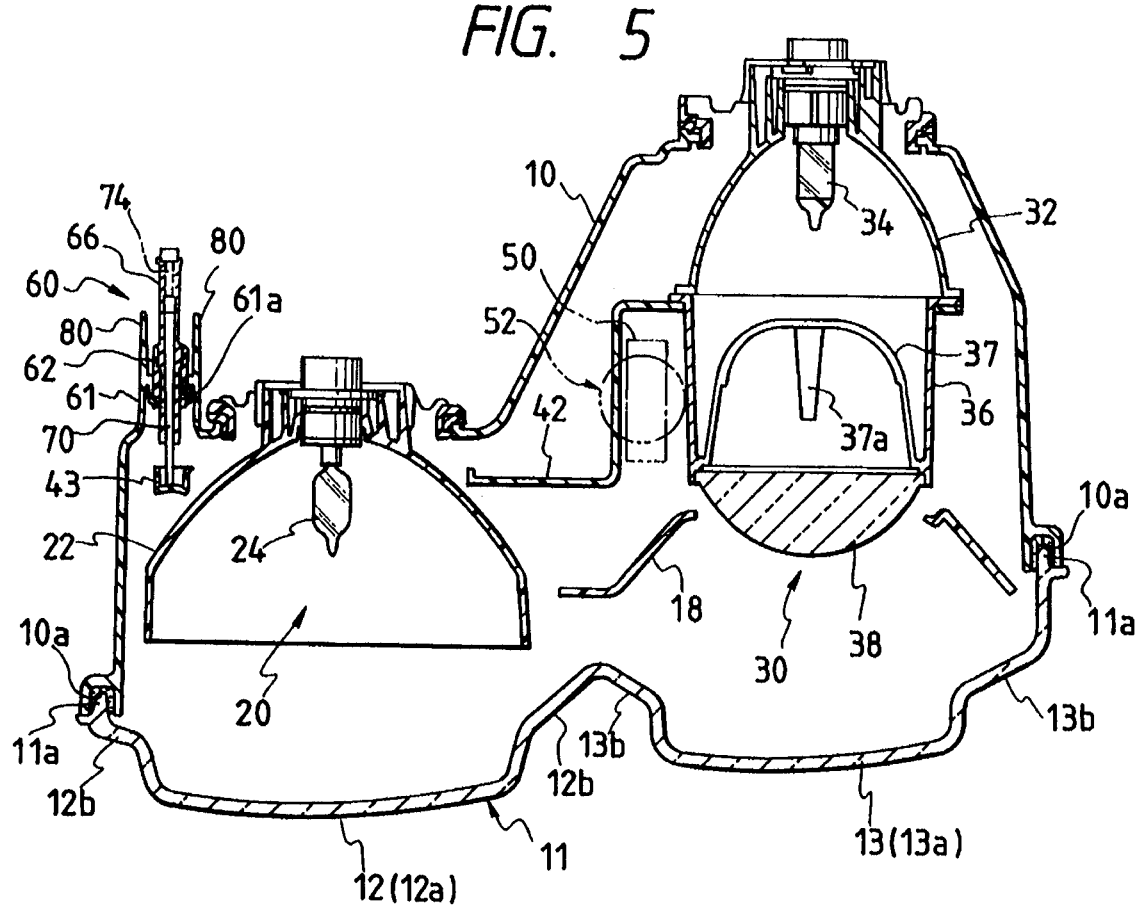
FIG. 5 is a horizontal cross-sectional view taken along line V—V in FIG. 3 showing the headlamp.
Figure 6:
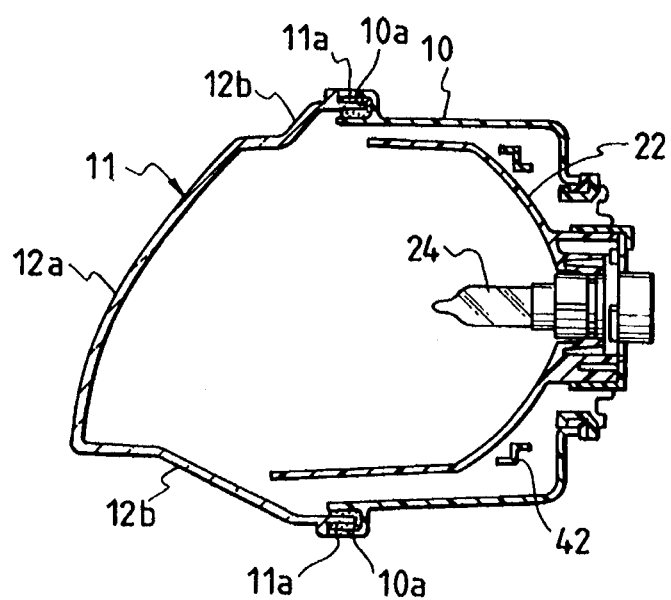
FIG. 6 is a longitudinal cross-sectional view taken along line VI—VI in FIG. 3 of the headlamp.
Figure 7:
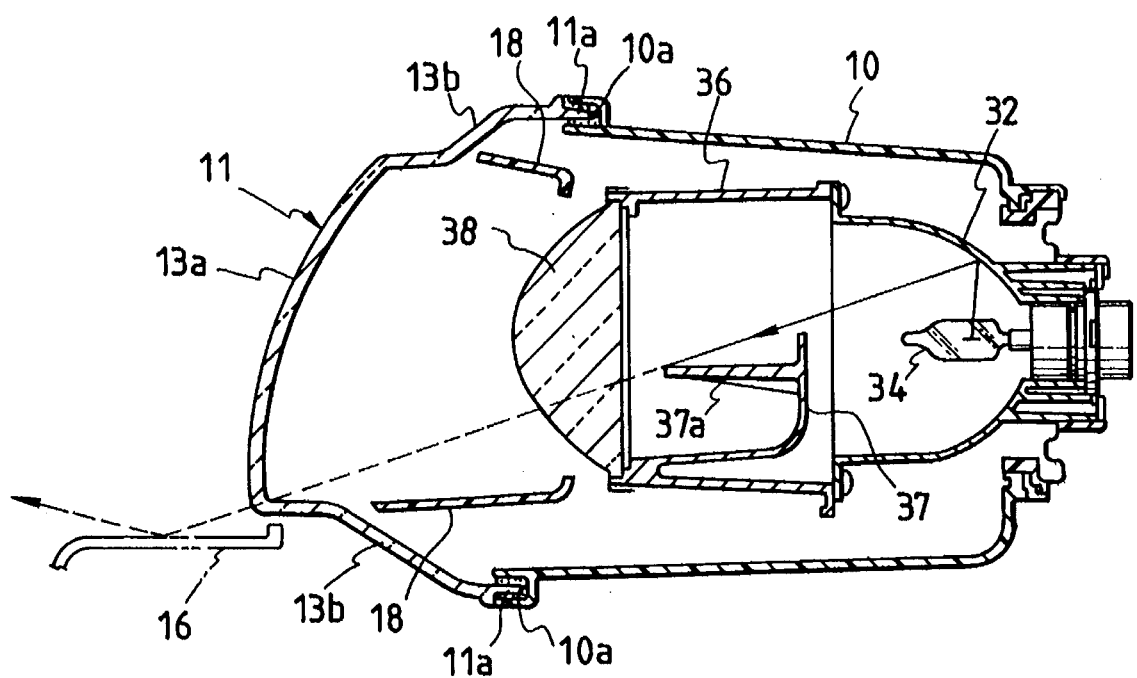
FIG. 7 is a longitudinal cross-sectional view taken along line VII—VII in FIG. 3 of the headlamp.

A linear bubble-tube level vial 50 as a tilt measuring instrument for measuring a vertical tilt of the lamps 20 and 30 is attached to the attachment 42 (see FIGS. 3 and 5). A transparent observation window 52 is formed in the upper wall of the lamp body, located above the linear bubble-tube level vial 50. A bubble position of the linear bubble-tube level vial 50, that can be seen through the observation window 52, reads a quantity of tilt of the lamps 20 and 30. When a bubble position is deviated from a zero point (the lamps 20 and 30 is vertically tilted with respect to the reference level), this tilt may be removed by turning the vertical aiming screw 44.

A tilt measuring instrument 60 for detecting a horizontal tilt of the lamps 20 and 30 is provided between the lamp body 10 and the attachment 42. The tilt measuring instrument 60 is made up of a longitudinally extending tubular fixed holder 62, which is inserted and fastened to an outwardly protruding tubular part 61 formed on the rear wall of the lamp body 10; a longitudinally extending, transparent movable holder 66 for zero adjustment, which is screwed into the fixed holder 62; a coiled spring 74, contained in the movable holder 66, for urging a slider 70 outward from an opening 66a at the front end of the movable holder; an indicator 67 attached to the rear part of the movable holder 66; and a scale 71, attached to the slider 70, provided corresponding to the indicator 67.

A fixed holder receiving hole 61a is formed in the outwardly protruding tubular part 61 integral with the lamp body 10. The fixed holder 62 is inserted and firmly set to the holder receiving hole 61a. The fixed holder 62 may be secured to the lamp body 10 by fastening a pair of flanges 62a to a boss portion 61b, which are protruded from the rear side of the lamp body 10, by means of screws.

Figure 4:
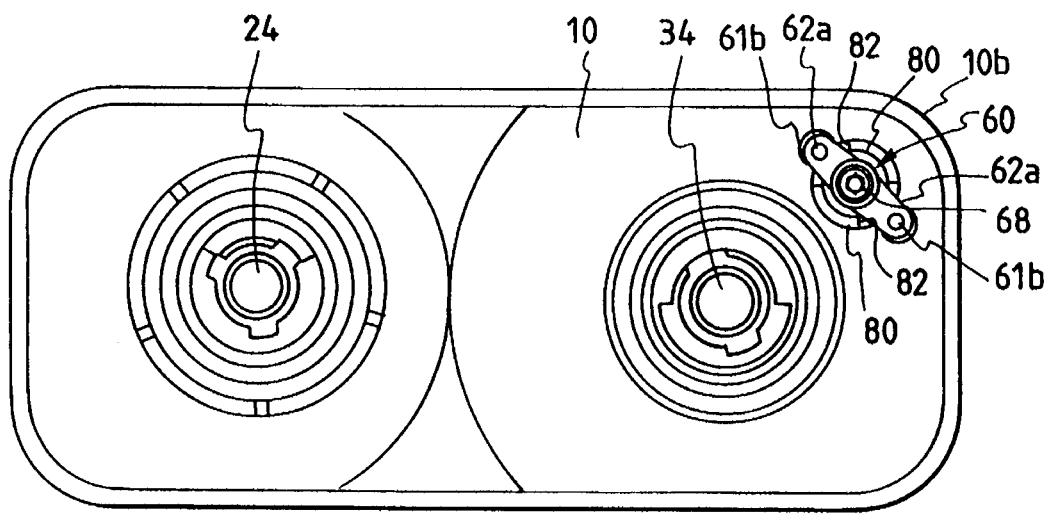
FIG. 4 is a rear view of the headlamp.
Figure 8:
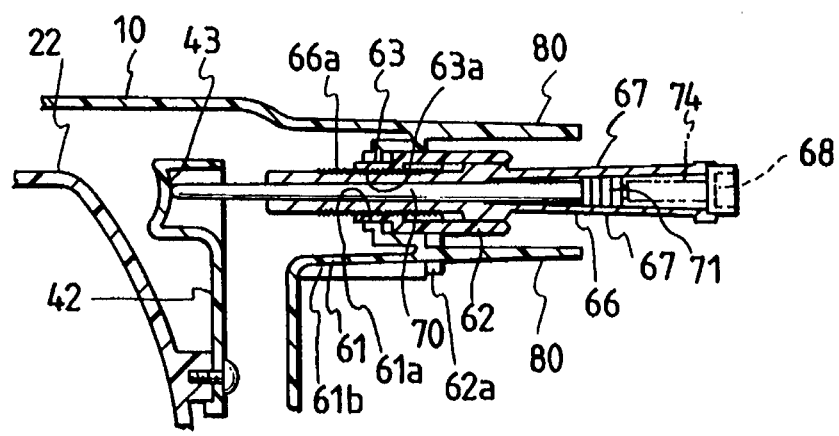
FIG. 8 is enlarged, longitudinal cross-sectional view taken along line VIII—VIII in FIG. 3 of a tilt measuring instrument for measuring a horizontal tilt of the light projection by the headlamp.

A pair of upstanding walls 80, continuously extending rearwardly from the protruded part 61, are formed on the circumferential edge of the holder receiving hole 61a. As shown in FIGS. 4 and 8, when a tubular member is longitudinally cut out at two opposed locations on the circumference thereof, two walls of the tubular member, which are not cut out, serve as the upstanding walls 80. Flanges 62a of the fixed holder 62 are respectively inserted into cut-out portions 82 and fastened thereto by means of screws. The cut-out portions 82 formed adjoining to the upstanding walls 80 engage the flanges 62a of the fixed holder 62, thereby positioning the fixed holder 62 in the circumferential direction.

As best illustrated in FIG. 8, a male screw portion 66a is formed on the circumferential surface of the front end of the movable holder 66 made of transparent synthetic resin. This male screw portion 66a is screwed into a female screw portion 63a of a reduced diameter portion 63 of the fixed holder 62. The movable holder 66 is greatly extended rearward from the rear wall of the lamp body. The movable holder 66 is a tubular member with a closed rear end. The closed end of the movable holder 66 has a concavity 68, hexagonal in cross section, which receives a tool for turning the movable holder. When the concavity 68 is turned by the tool, the movable holder 66 moves to and from the fixed holder 62, that is, a zero-point adjustment is easily performed.

The slider 70, located within the movable holder 66, is urged forward by the resilience of the coiled spring 74, the front end of the slider 70 coming in contact with a vertical wall 43 of the attachment 42 extending on the rear side of the reflectors 14. The slider 70 longitudinally slides within the movable holder 66 when the attachment 42 is tilted about the vertical axis $L_y$. For the scale 71 formed on the slider 70, the center graduation and the remaining graduations are marked with different colors. The center graduation is previously set at the indicator 67. A zero-point adjustment allows a deviation of the indicator from the center graduation from the indicator to show a horizontal tilt of the lamps 20 and 30.

The upstanding walls 80 are extended surrounding the movable holder 66 greatly extended rearward, and located at a corner part 10b of the lamp body 10. With this construction, when a headlamp with the tilt measuring instrument 60 is transported or mounted on a car body, the movable holder 66 rarely hits another component, so that the tilt measuring instrument 60 is little damaged.

Reference numeral 18 designates an extension with a mirror surface color disposed so as to enclose the projection lamp 30. The extension 18 causes the entire lamp chamber to take the same mirror face color as that of the reflector 22; the interior of the lamp thus looks bright and aesthetically pleasing.

Although the foregoing embodiment employs the reflection type lamp for main beams and the projection type lamp for sub-beams, the other combination of the lamps are also applicable according to the present invention. For example, a projection type lamp for main beams and a reflection type lamp for sub-beams can be employed. Further, a couple of the reflection type lamps or a couple of projection type lamps may be used for the main beams and sub-beams. Further, in addition to the lamps for the main beams and sub-beams, a third small lamp for illuminating inside the lamp chamber may also be disposed in the lamp chamber.

As described above, in a headlamp for a motor vehicle of the invention, with provision of the substantially circular, dish-like protruded portions and the flare regions formed around the fringes of the protruded portions, the cross-sectional secondary moment of the front lens is increased, so that the shock resistance of the front lens is high. Further, with the protruded portions and the flare regions, the surface area of the front lens 11 is increased, and the heat radiation is good. The resultant combination headlamp is very durable.

What is claimed is:

1. A combination headlamp for a motor vehicle, comprising:

a lamp body having a front opening;

a front lens coupled with said front opening of said lamp body for defining a lamp chamber;

a first lamp, for irradiating a main beam, accommodated in said lamp chamber; and a second lamp for irradiating sub-beams, accommodated in said lamp chamber, wherein said front lens includes a base portion which is secured to said lamp body, a peripheral portion extending forwardly from said base portion and first and second protruding portions respectively located directly in front of said first and second lamps, said first and second protruding portions protruding forwardly of said peripheral portion and only being positioned directly in front of said first and second lamps, said first and second protruding portions having an elliptical shape as viewed from the front and being dimensioned and sized to be substantially equal to said first and second lamps, respectively, said first and second protruding portions being connected to said peripheral portions by flared portions which extend in an inclined manner.

2. The combination headlamp according to claim 1, wherein said lamp body and said front lens are formed of a synthetic resin.

3. The combination headlamp according to claim 1, wherein said first lamp and said second lamp are coupled together by an attachment extending across said lamps.

4. The combination headlamp according to claim 3, further comprising a linear bubble-tube level vial for measuring a vertical tilt of said first and second lamps, said level vial being attached to said attachment.

5. The combination headlamp according to claim 4, wherein said lamp body comprises a transparent observation window formed in a upper wall thereof, said window being located above said linear bubble-tube level vial.

6. The combination headlamp according to claim 3, further comprises a tilt measuring instrument for detecting a horizontal tilt of said first and second lamps, said tilt measuring instrument being provided between said lamp body and said attachment, said tilt measuring instrument comprising:

a fixed holder extending longitudinally and being inserted into a holder receiving hole in said lamp body, said fixed holder being fastened to an outwardly protruding tubular part formed on a rear wall of said lamp body;

a transparent movable holder extending longitudinally for zero adjustment, said movable holder being screwed into said fixed holder;

a coiled spring contained in said movable holder for urging a slider outward from an opening at a fore end of said movable holder;

an indicator attached to said rear part of said movable holder; and a scale attached to said slider which provided corresponding to said indicator.

7. The combination headlamp according to claim 4, wherein said outwardly protruding tubular part is integral with said lamp body, and said fixed holder is inserted and firmly set in said holder receiving hole.

8. The combination headlamp according to claim 7, wherein said fixed holder is secured to said lamp body by fastening a pair of flanges to a boss portion protruding from said rear side of said lamp body.

9. The combination headlamp according to claim 8, further comprising a pair of upstanding walls continuously extending rearwardly from said outwardly protruding tubular part formed on a circumferential edge of said holder receiving hole.

10. The combination headlamp according to claim 7, wherein said fixed holder comprises flanges respectively inserted into cut-out portions and fastened thereto by means of screws, said cut-out portions being formed adjoining to said upstanding walls and engage with the flanges of said fixed holder, thereby positioning said fixed holder in the circumferential direction.

11. The combination headlamp according to claim 10, wherein said movable holder comprises a male screw portion formed on a circumferential surface of said fore end of said moveable holder made of transparent synthetic resin, said male screw portion being screwed into a female screw portion of a reduced diameter portion of said fixed holder, said movable holder greatly extending rearward from said rear wall of said lamp body, said movable holder being of a tubular member with a closed rear end having a concavity which receives a tool for turning said movable holder.

12. The combination headlamp according to claim 1, wherein said first lamp is a reflection type lamp and said second lamp is a projection type lamp.

13. The combination headlamp according to claim 1, wherein said first lamp is a projection type lamp and said second lamp is a reflection type lamp.

14. The combination headlamp according to claim 1, wherein at least one of said first and said second lamps is a projection type lamp.

15. The combination headlamp according to claim 1, wherein at least one of said first and said second lamps are reflection type lamp.

16. The combination headlamp according to claim 1, further comprising an extension, a mirror surface color, disposed so as to enclose said second lamp.

* * * * *